US008444805B2

(12) United States Patent
Pedersen et al.

(10) Patent No.: US 8,444,805 B2
(45) Date of Patent: May 21, 2013

(54) LOW FORMALDEHYDE EMISSION ADHESIVE SYSTEM

(75) Inventors: Astrid Pedersen, Skedsmolorset (NO); Kristin Grøstad, Hagan (NO); Per Olav Sandbakken, Oslo (NO)

(73) Assignee: Dynea Oy, Helsinki (FI)

( * ) Notice: Subject to any disclaimer, the term of this patent is extended or adjusted under 35 U.S.C. 154(b) by 0 days.

(21) Appl. No.: 13/025,187

(22) Filed: Feb. 11, 2011

(65) Prior Publication Data
US 2011/0198028 A1 Aug. 18, 2011

Related U.S. Application Data

(63) Continuation of application No. PCT/EP2009/060462, filed on Aug. 12, 2009.

(30) Foreign Application Priority Data

Aug. 13, 2008 (GB) .................................. 0814778.7

(51) Int. Cl.
*C09J 4/00* (2006.01)
*C08K 5/21* (2006.01)

(52) U.S. Cl.
USPC ....................................... 156/331.5; 524/211

(58) Field of Classification Search
USPC ....................................... 524/211; 156/331.5
See application file for complete search history.

(56) References Cited

U.S. PATENT DOCUMENTS

| | | | |
|---|---|---|---|
| 3,218,320 A * | 11/1965 | Christoffel et al. ............ 544/201 |
| 4,409,293 A | 10/1983 | Williams | |
| 4,963,212 A | 10/1990 | Rasmussen | |
| 5,684,118 A | 11/1997 | Breyer | |
| 6,590,013 B1 | 7/2003 | Andersen | |
| 2003/0079832 A1 | 5/2003 | Pirhonen | |
| 2003/0079833 A1 | 5/2003 | Pirhonen | |
| 2007/0240822 A1 | 10/2007 | Weinkotz et al. | |

FOREIGN PATENT DOCUMENTS

| | | |
|---|---|---|
| DE | 19603988 A1 | 8/1997 |
| EP | 0501174 B1 | 9/1992 |
| EP | 1291389 A1 | 3/2003 |
| FR | 2622500 A1 | 5/1989 |
| GB | 589131 | 1/1944 |
| WO | 9948991 A1 | 9/1999 |
| WO | 01/70898 A1 | 9/2001 |
| WO | 02/072324 A1 | 9/2002 |
| WO | 02068178 A2 | 9/2002 |
| WO | 2006015750 A1 | 2/2006 |
| WO | 2007/040410 A1 | 4/2007 |
| WO | 2010/018202 A1 | 2/2010 |

OTHER PUBLICATIONS

M. Y. Dietrick and T.F. Terbilcox, Resorcinol derivatives for scavenging formaldehyde in particleboard, Proceedings of the Washington State University International Particleboard/Composite Materials Symposium (1983), 17th, 233-48.

T. W. Lee et al, Influence of different catalyst systems on the hydrolytic stability of particleboards bonded with unmodified and modified UF—adhesives, Holzforschung 48 (1994) Suppl., pp. 101-106.
E. Roffael, Modifizierung von Harnstoff-formaldehydharzen mit Resorcin, Adhesion, 1980, Heft 11, pp. 422-424.
Search report of UK-IPO for GB0814778.7 (issued Dec. 30, 2008).
International search report for the present application (issued Jan. 19, 2010).
AKZO D3: S. Kim et al, "Effect of addition of polyvinyl acetate to melamine• formaldehyde resin on the adhesion and formaldehyde emission in engineered flooring", Int. J. Adhesion & Adhesives 25 (2005), p. 456-461.
AKZO D4: Encyclopedia of Polymer Science and Technology, vol. 10 (2004), p. 369-385.
AKZO D4a:Publication information for D4.
AKZO D8: "Comparative test between crosslinking and non-crosslinking vinylic emulsions" from the official EPO file of D7 (received by the EPO on Oct. 10, 1994 and thus made available from that date).
Opposition filed by AKZO-Nobel on Jul. 12, 2012 with the European Patent Office.
AKZO D2: M. Dunky, Resins for Ultra-Low Formaldehyde Emission According to the Japanese F**** Quality, Wood Adhesives 2005, p. 343-348, 2006.
AKZO D6: Wacker Productoverview Vinnapass—and Vinnol—Dispersions.
BASF D5: Melamine-formaldehyde resins, Material Archiv—www.materialarchiv.ch, published on Feb. 25, 2009.
BASF D9: www.chemieideen.net/kkr-cd/Kirchsteiger.../7__81__05__01__b3.doc. KLEMM, Chemieideen.net. Mar. 2004.
BASF D10: Prefere 4546, Technical Data Sheet, DYNEA, Oct. 2009.
BASF D11: Prefere 5020, Safety Data Sheet, DYNEA, May 2004.
BASF D12A: Prefere 4720, Safety Data Sheet, Jan. 20, 2005.
BASF D12B: List of approved adhesives, MPA, Stuttgart, 2006.

* cited by examiner

*Primary Examiner* — John Uselding
(74) *Attorney, Agent, or Firm* — Coraline J. Haitjema; David P. Owen; Hoyng Monegier LLP

(57) ABSTRACT

The invention relates to an improved two component adhesive system, a kit comprising said two adhesive components, its use and a method for production of interior wood products, in particular form-pressed products, parquet floor elements and solid wood panels with very low formaldehyde emission and to the interior wood products obtainable having improved properties.

The two-component adhesive system comprises adhesive component I comprising a 50-70 wt % melamine-formaldehyde (MF) type resin in 25-40 wt % water and adhesive component II comprising 25-40 wt % of a water based dispersion adhesive, 15-40 wt % of a formaldehyde scavenger and an acidic compound in an amount such that the pH of adhesive component II is 1.5-6.5, wherein adhesive component I and II are to be applied in a weight ratio I:II of 1:0.5 to 1:1.5 and the adhesive system has a molar ratio of formaldehyde (F) to total amino group (F/NH$_2$) between 0.2 and 0.7.

27 Claims, No Drawings

LOW FORMALDEHYDE EMISSION ADHESIVE SYSTEM

CROSS-REFERENCE TO RELATED APPLICATIONS

This application is a continuation of PCT application number PCT/EP2009/060462, filed on Aug. 12, 2009, which claims priority from United Kingdom patent application number GB 0814778.7 filed on Aug. 13, 2008. All of these applications are hereby incorporated by reference in their entireties.

FIELD OF INVENTION

The invention relates to an improved two component adhesive system, a kit comprising said two adhesive components, its use and a method for production of interior wood products, in particular form-pressed products, parquet floor elements and furniture boards with very low formaldehyde emission and to the interior wood products obtainable having improved properties.

BACKGROUND

Form-pressed products (also called form-bent products or shaped/curved plywood products) typically consist of from 3 to 50 layers of veneer glued together with an adhesive. The gluing process is performed in a mould to give the final product the desired shape. The most commonly used adhesive for this application is urea formaldehyde type adhesive (UF) as it gives excellent performance as well as being inexpensive. UF adhesives are, however, not the only adhesive type used for form pressing. In cases where increased moisture resistance is required, Melamine Urea Formaldehyde (MUF) adhesives are used. In cases where formaldehyde free solutions are required PVAc or Emulsion Polymer Isocyanate (EPI) adhesives are used. PVAc adhesives can only be used for very simple construction without much tension due to the thermoplastic nature of PVAc adhesives. For more challenging constructions, EPI adhesives may be used. The use of EPI adhesives offers challenges such as handling of the isocyanate hardener, limited pot life, limited assembly time, relatively long pressing times, potential of creep of the glue line (due to the thermoplastic nature of the adhesive) and high cost.

UF adhesives are based on formaldehyde and will, depending on the adhesive formulation, give more or less emission of formaldehyde from the final product. With the increased focus on formaldehyde emission and increasingly stricter restrictions of the emissions this is posing a greater and greater problem. This has been accentuated by some customer's decision of using formaldehyde free adhesives in all products where this is possible as well as the suggestion of very strict Californian regulations regarding formaldehyde emission from glued products.

Over the years the UF technology has been improved to minimize the amount of formaldehyde that is emitted from the glued products. For chipboards this has resulted in a reduction of formaldehyde emission from a level typically about 100 mg/100 g before 1970, to the present level of about 5 mg/100 g (according to the EP test perforator method EN120). There is however a limitation to how much can be done with a UF system as the bond quality is getting reduced as the emission is lowered. This is a very big problem for form bent products where the final product usually contains a high number of glue lines (from 2 to 49) and a large amount of glue. Each glue line must emit close to no formaldehyde to give a product with the required low emission. It is an object of the invention to provide a solution to this problem.

PRIOR ART

U.S. Pat. No. 4,409,293 describes a method for binding a lignocellulose material using an UF adhesive system, wherein the formaldehyde emission is reduced by reducing the F:U ratio to between 1:1 and 1:2. The reduction of the F:U ratio has, however, great impact on the properties of the adhesive. Generally, an adhesive having a low F:U ratio will normally result in a glue line that is more brittle than an adhesive having a higher ratio, lower quality of gluing, i.e. a higher degree of gluing defects, reduced water resistance and reduced strength. Additionally, a reduction of the F:U ratio results in a reduction of the reactivity of the adhesive, resulting in a prolonged curing time. To increase the curing speed, higher press temperature or the addition of more acid or acidic components are necessary. A long curing time, and correspondingly long pressing time, is unwanted as it results in a lower production capacity of a plant. Higher pressing temperatures are unwanted due to higher energy costs and due to the increased risk of the glued product becoming more unstable (more curved). Increased addition of acid/acid components is unwanted since the increased the reactivity of the adhesive system not only shortens the curing speed but also reduces the pot life and assembly time of the system.

WO0170898 describes an adhesive system comprising (a) an etherified amino resin, preferably etherified MF resin, (b) a polymer prepared from one or more ethylenically unsaturated monomers, preferably PVAc (c) a curing agent, preferably formic acid and (d) a polyvinyl alcohol. Further described is a hardener composition for use in combination with amino resins comprising (b) a polymer prepared from one or more mono-ethylenically unsaturated monomers, preferably PVAc, said polymer containing post-crosslinking groups, (c) a carboxylic acid, preferably formic acid and (d) a polyvinyl alcohol. WO0170898 does not at all deal with the problem of formaldehyde emissions and has been shown to give unacceptable results as illustrated in Example 1, C1.2 (1-3/2-3).

EP0501174 B1 discloses a hardening composition for UF glues containing an aqueous emulsion of polyvinyl acetate having post-crosslinking groups, an ammonium salt and urea to control the catalytic activity of the ammonium salt during the polymerization of the glue. However, this hardening composition is not suitable for adhesive systems that have to be cured at room temperature and will not give extremely low formaldehyde emission.

U.S. Pat. No. 4,963,212 relates to a method to make form pressed products, in particular furniture frames or frame parts from wood laminates comprising mutually superposed or superimposed laminate of wood and intermediate layers of a settable or hardenable binder or glue, in particular a thermo-setting, two-component urea glue (Casco No. 1203). Similarly, FR2622500 relates to a method to make form pressed products using melamine based adhesive. The described methods are hereby incorporated by reference as suitable methods for making form pressed products according to the invention.

US2003/0079833A1 relate to an adhesive system comprising a melaminic amino resin, in particular melamine-formaldehyde ("MF"), and a phenolic resin composition comprising an acid and a phenolic resin and to a method of gluing wood based materials whereby said adhesive system is provided onto wood based materials and cured. US2003/0079832A1 describes the same invention for urea (UF) resin based adhesives. Formaldehyde is to various extents present in formaldehyde based melaminic amino resins as free formaldehyde but is also further emitted from the resins during curing. According to US2003/0079833A1 the problem of the emission of free aldehyde is solved by using an adhesive system comprising a melaminic amino resin and a phenolic resin composition, wherein the phenolic resin composition comprises an acid and a phenolic resin, which is a resorcinol resin or a tannin resin, or a mixture thereof.

An alternative solution to reduce formaldehyde emissions is to add scavengers binding free formaldehyde that is present in the adhesive or is released during the curing of the adhesive. Depending on the type and amount of scavenger added, it can also bind free formaldehyde during the lifetime of the glued product. However, such additives generally negatively affect the quality of the adhesive bond.

U.S. Pat. No. 5,684,118 describes the reduction of the emission of formaldehyde by binding free formaldehyde with urea and describes that, in order to reduce the emission of formaldehyde sufficiently, urea has to be added in an amount that is detrimental to the adhesive properties. It is further described to use a low molecular weight melamine urea formaldehyde adhesive as a formaldehyde scavenger. The fact that this adhesive has to be prepared separately makes this solution relatively costly.

WO 02/072324 describes a method of reducing formaldehyde emission from a laminated wooden product glued with UF adhesive wherein at least one of the surfaces to be glued is treated, in a separate step, with a solution comprising an ammonium salt before the adhesive is applied. Ammonium salts are known to react with free formaldehyde to bind the formaldehyde in a non-volatile form. The ammonium salt solution may additionally comprise urea to improve the formaldehyde scavenging effect of the treatment. This method does, however, require an additional process step, adding cost to the finished product.

EP 1 291 389 describes to add a polyamide, such as various proteins and other oligomeric or polymeric polyamides to the adhesive to reduce the formaldehyde emission. Natural proteins and longer polyamides tend to give an unwanted increase in the viscosity of the adhesive.

GB 589,131 describes the use of a formaldehyde fixing agent, such as resorcinol, in a urea formaldehyde resin to avoid premature hardening. The use of resorcinol as formaldehyde scavengers in UF adhesives is also described in "Resorcinol derivatives for scavenging formaldehyde in particleboard", M. Y. Dietrick and T. F. Terbilcox, Koppers Co., Inc., Monroeville, Pa., USA, Proceedings of the Washington State University International Particleboard/Composite Materials Symposium (1983), 17th, 233-48, "Influence of different catalyst systems on the hydrolytic stability of particleboards bonded with unmodified and modified UF-adhesives", T. W. Lee et al, in Holzforschung 48 (1994) Suppl., pages 101-106, and "Modifizierung von Harnstoff-formaldehydharzen mit Resorcin", E. Roffael in Adhesion 1980, Heft 11, pages 422-424. Resorcinol is known from the references both as a formaldehyde scavenger and as fortifier for the hardened adhesive. Addition of resorcinol during the condensation reaction for production of the UF resin does, however, lower the reactivity of the adhesive, and increases the cost of the adhesive system. Resorcinol further results in dark coloured glue lines, which is not appreciated in applications with light coloured glue species and visible glue lines.

WO2007040410 describes urea formaldehyde adhesive systems for manufacturing of glued products, in particular also curved plywood and solid wood panels. The formaldehyde emission of this adhesive system is substantially reduced compared to prior art adhesive systems by using a hardener comprising, as a formaldehyde scavenger, a combination of urea and resorcinol. However, also this adhesive system still has formaldehyde emission levels which are too high to meet the newest stricter requirements for indoor use.

U.S. Pat. No. 6,590,013 relates to a hardener for use in UF and mUF based adhesive compositions comprising a polyvinylacetate emulsion a metal chloride, an ammonium salt and optionally a formaldehyde capturing agent. The hardener gives high curing rates but, when applied to the adhesive compositions, does not result in an adhesive system having low formaldehyde emissions, as illustrated by Table 10 below, specifically C6.1, a comparative example according to the general teaching of U.S. Pat. No. 6,590,013.

The problem of all of the described prior art adhesive systems is that the formaldehyde emission is still not low enough to meet the strictest formaldehyde emission requirements whilst maintaining good glue properties. The object of the invention therefore is to provide an improved adhesive system that has both a very low formaldehyde emission level and good glue properties.

SUMMARY OF THE INVENTION

According to the invention there is provided a two-component adhesive system comprising:
  adhesive component I comprising (in dry wt % relative to the total weight of adhesive component I):
    I.a) 50-70 wt % of a melamine-formaldehyde (MF) type resin and
    I.b) 0-35 wt % of organic or inorganic filler,
    I.c) 0-10 wt % of further additives
    I.d) 25-40 wt % water,
  adhesive component II comprising (in dry wt % relative to the total weight of adhesive component II):
    II.a) 20-40 wt % of a water based dispersion adhesive, preferably functionalized or unfunctionalized PVAc
    II.b) 0-10 wt % of a thickener,
    II.c) 15-40 wt % of a formaldehyde scavenger, preferably an amino-compound,
    II.d) an acidic compound in an amount such that the pH of adhesive component II is 1.5-6.5,
    II.e) 0-35 wt % of organic or inorganic filler,
    II.f) 0-10 wt % of further additives,
    II.g) 25-40 wt % water,
wherein adhesive component I and II are to be applied in a weight ratio I:II of 1:0.5 to 1:1.5, preferably 1:0.6-1:1.2, and more preferably 1:0.9-1.15 and the adhesive system has a molar ratio of formaldehyde (F) to total amino group (F/NH$_2$) between 0.2 and 0.7, preferably, 0.3-0.7, more preferably 0.25-0.55, more preferably 0.35-0.55 and most preferably 0.45-0.55.

It is noted that, even though the adhesive components, in particular the resin and the dispersion adhesive, often are available in the form of a solution, the wt % as used herein represents the weight percentage of the pure component, which for the resin components is also referred to as the dry weight. Terms as used are defined, unless defined otherwise herein, as in WO2008026058 and WO 2007/040410 herewith incorporated by reference. Optional fillers, thickeners or further additives can be added to both adhesive components I and II of the adhesive system.

It was found, as exemplified by the examples, that the adhesive system according to the invention combines an extremely low formaldehyde emission with very good gluing properties, making the adhesive system highly suitable for use in interior wood products, preferably form-pressed products, solid wood panels and parquet floor elements. These wood products can be produced using the adhesive system according to the invention giving products with extremely low formaldehyde emission while at the same time maintaining curing speed, bond quality, assembly time, pot life etc. The system is more expensive than state of the art UF systems but competitive with the price of EPI systems while avoiding the hazardous isocyanate. The system is also significantly easier to use than EPI adhesives as it tolerates longer waiting time from the adhesive component I and II before they are brought in contact on the substrate surface and pressing (assembly time), a shorter curing time, a longer effective use time (pot life), and less problems with foaming and sticking to metal parts in the time during pressing etc.

DETAILED DESCRIPTION OF THE INVENTION

The MF type resin (I.a) in the two-component adhesive system is an amino resin wherein melamine is at least one of the raw materials used in the production thereof and can be any melaminic amino resin, such as melamine-formaldehyde ("MF"), melamine-urea-formaldehyde ("MUF"), and condensates of formaldehyde and melamine together with any other compounds containing amino, imino or amide groups such as thiourea, substituted urea, and guanamines. Preferably the MF type resin (I.a) is chosen from the group comprising MF resin (substantially pure M and F), urea modified MF resin (uMF) comprising between 0.1 and 50 wt % (urea weight relative to the total weight of urea and melamine) or modified MF or uMF resins. Preferably, in uMF the urea is present in a relatively small amount, so preferably 0.1 and 35 wt %, more preferably 1 and 20 wt % even more preferably 1 and 10 wt % and typically about 5 wt % of urea (U) (relative to the total weight of M and U). The modified MF or uMF resins are for example etherified MF or uMF resin. Most preferably the resin is MF or etherified MF resin. Preferably, in view of adhesive properties, the MF type resin in adhesive component I has a molar ratio $F/NH_2$ of 0.4-1.2, preferably 0.9-1.15.

Adhesive component I has a high pH, preferably between 7 and 12, more preferably between 9 and 11. This is important in view of the stability of the adhesive solution. At high pH the risk is lower that the resin crosslinks prematurely.

Filler can be used to adjust the glue mix viscosity and improve the bond quality by adjusting the penetration of the glue in the wood and allow the adhesive to better accommodate irregularities in the surface of the substrate. The filler may be included in one or both adhesive components. Preferably, the filler is present in relative amounts between 1 and 35, preferably between 2 and 25 and more preferably between 3 and 20% or between 3 and 15 (% expressed as weight of filler per weight of adhesive component I or II×100). Examples of suitable fillers are organic fillers such as wood flour/fibers flour, starch, gluten, different types of wood flours or (nut)shell flours as well as inorganic fillers such as clay, in particular china clay (kaolin), talc and calcium carbonate.

Further, adhesive component I may comprise 0.1-10 wt %, more preferably 2-5 wt % of one or more further customary additives (I.c) preferably chosen from the group of anti-foaming agents, thickeners, surfactants, pigments, colorants, rheology modifiers, and/or flexiblisers. Examples of thickeners are polyvinyl alcohol, and cellulose compounds such as hydroxy-ethyl cellulose and carboxy-methyl cellulose.

The amount of resin in adhesive component I preferably is chosen as high as possible in view of achieving good bonding properties, but on the other hand cannot be too high in view of stability and shelf life of the adhesive component I. It is also important that the viscosity is not too high or too low in view of processability in application of the adhesive and optimalisation of the penetration into the wood substrate. Therefore, adhesive component I preferably has solids content between 60 and 75 wt %, more preferably between 65 and 72 wt % (solid content measured after drying of 1 gr sample for 2 hours at 120° C. in a ventilated oven in air). Preferably, adhesive component I has a viscosity between 1000 and 10000 mPas, preferably between 1500-10000 mPas, more preferably between 2000 and 8000 mPas, most preferably between 3000 and 5000 mPas (viscosity measured with Brookfield RVT at 25° C., spindle 4, and at a speed of 20 rpm).

Preferably, the adhesive component I does not comprise another resin than the resin Ia as specified and more preferably consists of the components Ia, Ib, Ic and Id as specified herein.

Adhesive component II is not an ordinary hardener, but is special in different ways, in particular in that it comprises, apart from the acidic component II.d for hardening the resin I.a in adhesive component I, a second type of adhesive resin; dispersion adhesive (II.a), in combination with a relatively large amount of formaldehyde scavenger II.c relative to the amount of melamine resin I.a in the resulting mixture. Further, the relative amount of the adhesive component II relative to adhesive component I is very high; preferably close to 1.

The dispersion adhesive (II.a) in adhesive component II can in principle be any dispersion adhesive, but preferably is functionalized or un-functionalized PVAc. In principle any type of PVAc can be used, but it is preferred to use functionalized PVAc. For description of the functionalisation see the patent WO2007040410.

Preferably, the adhesive component II does not substantially comprise another adhesive resin type than the resin II.a as specified and more preferably consists of the components IIa, IIb, IIc, IId, IIe, IIf and IIg as specified herein.

As described above it is preferred that the viscosity of the adhesive components is not too low to prevent too high penetration of the adhesive component or adhesive after mixing into the wood substrate. The dispersion adhesive, in particular PVAc, may have sufficiently high viscosity to be used without extra addition of thickener. However, scavenger component II.c (preferably urea) is present in significant amounts and may dilute and lower the viscosity of the water based dispersion adhesive II.a (preferably PVAc) such that the viscosity of adhesive component II is reduced to below 800 mPa. In that case 0.1-10 wt % of a thickener II.b is most preferably added to adjust the viscosity of adhesive component II above 800 mPa. Suitable thickeners for example are Polyvinyl-pyrolidone or more preferably Polyvinyl-alcohol.

Preferably, adhesive component II has a viscosity between 500 and 10000 mPas, preferably 1500-10000 mPas, more preferably 1000-8000 mPas, and most preferably 2000-5000 mPas. The choice of the viscosity also depends on the envisaged end use. The adhesive components can be applied to the substrate surface separately. If the two-component adhesive system is applied as a mixture, the viscosity of the adhesive obtained after mixing of components I and II is between 1000 and 5000 mPas, preferably between 1500 and 3000 mPas and most preferably between 1800-2500 mPas (at 25° C.). Most preferably the viscosity of the adhesive mix is 1800-1900 mPas when mixed in a ratio of 1:1.2.

The formaldehyde scavenger (II.c) is used to reduce the formaldehyde emission from the final glue mix during the lifetime of the end-product and is preferably chosen from the group of amino-compounds; preferably urea, thiourea, or amines (preferably primary and secondary amines), ammonia, ammonium salts or hydroxy compounds; most preferably urea. Other chemicals which can react with formaldehyde such as thiourea, ammonia, ammonium salts, amines can also be used (primary and secondary amines are most preferred). In principle, hydroxy functional aromatic compounds, such as phenols, resorcinol or tannins can be used for the same functionality, but these are less preferred in form pressing because they were found to reduce the reactivity and result in dark coloured glue lines, which is generally not appreciated. Preferably adhesive component II comprises 5 to 40 wt %, preferably 10 to 40 wt %, more preferably 15 to 40 wt %, and most preferably 25-35% of an amino-compound, preferably urea, as formaldehyde scavenger (II.c).

The acidic compound II.d can be an organic or inorganic acid, an acidic salt, or an acid generating compound or a combination thereof. The adhesive component II comprises an acidic compound (II.d) to lower the pH of adhesive component I when in contact to initiate the crosslinking reaction thereof. Preferably the acidic compound (II.d) is present in an amount such that the pH of adhesive component II is between 1.5 and 6.5, preferably between 2 and 3 and preferably such that the pH of the adhesive obtained after mixing of components I and II is between 3.3 and 6.5, and preferably 3.5 and 4.5. The amount of acidic component II.d typically is between 1 and 20 wt %, more preferably between 2 and 12 wt %.

The acidic compound II.d can be an organic or inorganic (protonic) acid or an acidic salt or a combination thereof, also including metal salts giving acidic reaction in aqueous solutions (non-protonic acids). Examples of suitable non-protonic acidic salts include aluminium chloride, aluminium nitrate and aluminium sulphate. Suitable organic protonic acids include aliphatic or aromatic mono-, di-, tri-, or polycarboxylic acids such as formic acid, acetic acid, maleic acid, malonic acid and citric acid. Also sulphonic acids such as para-toluene sulphonic acid, para-phenol sulphonic acid and benzene sulphonic acid are suitable. Inorganic protonic acids can be, for example, hydrochloric acid, sulphuric acid, nitric acid, phosphoric acid, boric acid, sulphamic acid. Examples of acid generating compounds are ammonium salts, preferably ammonium chloride, mono- and di-ammonium phosphate, ammonium sulphate or ammonium nitrate, which generate an acid in reaction with formaldehyde. Aluminium salts or similar salts have a dual function: they lower the pH so that adhesive component I will cure, but they will in addition have the possibility to crosslink eventual functionalized PVAc dispersion and/or polyvinylalcohol present in adhesive component I and/or II. Preferred acids are organic acids, most preferably formic acid.

For similar reasons as described above for adhesive component I, also adhesive component II can contain a filler. The choice of optional filler (II.e) in adhesive component II is more critical as the stability is an issue at the pH of adhesive component II. Preferably filler (II.e) is chosen in combination with other components to be stable at the prevailing pH, in particular pH=1.5-6.5, more in particular pH=1.5-4.

Adhesive composition II may further comprise a crosslinking agent for crosslinking PVAc adhesive II.a and/or eventual Polyvinyl alcohol present in the PVAc adhesive II a and/or polyvinyl alcohol used as thickener in adhesive component I and/or II, preferably metal cations, more preferably aluminium ions. This crosslinking agent is chosen such that the crosslinking only takes effect after mixing and/or application of the adhesive system. For example, Aluminium salts or similar salts have the possibility to crosslink functionalized PVAc adhesives and/or polyvinyl-alcohol, but because this can also catalyse the curing of adhesive component I, this compound is preferably added to adhesive component II.

Other crosslinkers that may be used are glyoxal or boric acid, or oligomers/polymers with reactive functional groups. It is noted that PVAc typically also contains polyvinyl-alcohol and that the MF resin will work as a crosslinker for this dispersion adhesive.

The invention also relates to a two-component adhesive kit comprising adhesive components I and II according to the invention in separate containers, i.e., where each component is housed in a separate container. Additionally, the adhesive component I maybe be delivered in liquid or solid (such as for example, powder) form. For example, adhesive component I can be a powder product comprising I.a, I.b, I.c, and I.d where water is added at some point in time before use. For example, water could be added from 2-3 days up to minutes before use of adhesive component I in the adhesive system.

Optionally, the two-component adhesive kit is provided with application means for applying component I and II in the suitable weight ratio between 1:0.5 to 1:1.5. Further, the adhesive system may comprise a solid weight ratio of melamine-formaldehyde (MF) type resin to formaldehyde scavenger is 1:0.11 to 1:1.20, preferably 1:0.15 to 1:0.9, and most preferably 1:0.20 to 1:0.70.

The application of the two adhesive components or a mixture thereof onto a wood based material can be done by any suitable method known in the art, such as spraying, brushing, extruding, roll-spreading, curtain-coating etc. forming shapes such as droplets, one or several strands, beads or a substantially continuous layer. A two-component adhesive can be applied to a substrate by spreading of glue mix of adhesive component I and II by roller spreaders, or by spraying of a glue mix of adhesive component I and II, or separate spraying of adhesive component I and II on to the veneer sheets, or by string application of a glue mix of the two adhesive components or of the separate adhesive components in close vicinity. The two-component adhesive kit can be provided with application means like roller spreaders, spraying means or string extrusion means optionally in combination with a previous mixing means.

In principle the adhesive system can be advantageously used in a variety of applications where wood based materials can be joined by an adhesive system, including fibres, chips and particles. As the particular advantages of the invention are targeted and best expressed and appreciated in high demanding applications, the invention in particular relates to the use of the two-component adhesive system according to the invention or of the two-component adhesive kit for the production of interior wood products, in particular form-pressed products, parquet floor elements as well as furniture boards. The use according to the invention is intended to also cover the use of the separate components or of combinations of components of the two-component adhesive system in an overall combination as described according to the invention to achieve the same effect. The invention also relates to interior wood products, in particular form-pressed products, parquet floor elements and furniture boards with low formaldehyde emission comprising the adhesive system according to the invention or as obtainable by the method according to the invention.

The invention also relates to a method for the production of an interior wood product, in particular a form-pressed product, parquet floor element or furniture board with low formaldehyde emission, comprising the steps of; applying adhesive I and II of the two-component adhesive system according to the invention in premixed form or separate, either simultaneous or consecutively, to one surface or on both opposing surfaces of wood layers to be bonded over at least part of the surface area thereof, assembling the wood layers provided with adhesive in a stack and pressing the stack at elevated temperature to shape the stack and cure the adhesive. The adhesive system can be provided by separately applying adhesive composition I and II onto the wood based materials. Alternatively, the method of the invention can comprise mixing the amino resin and the hardener to form the adhesive system and then providing the adhesive system onto the wood based materials. The stack is preferably pressed in a heated press or radio frequency (RF) press at a temperature between 60 and 120° C., preferably 90 to 100° C. at a pressure between 0.5 and 2, preferably between 0.6 and 1.5 N/mm². Form pressed products are produced from 3 to 50 layers of wood which are provided with the adhesive system to glue them together and pressed and cured to a form. The adhesive is applied on the wood layer in an amount between 100 and 250, preferably between 120 and 180 g/m², more preferably between 150 and 160 g/m². Parquet floor elements generally have a different structure, but in general are similarly made up of 2 or more layers glued together of which at least one layer is a wood product layer.

In particular in form-pressed products, the wood layers (also referred to as veneer sheets) are most commonly placed parallel to each other in the stack with the grain of each veneer sheet in the same direction or sometimes also cross wise. When using a roller spreader the glue mix are usually applied on both sides of every second veneer sheet, whereby every second sheet goes through the roller spreader and the stack is laid up at the other side of the roller spreader by alternating veneer sheets with and without glue. When spraying or when using string application, adhesive is applied to one side of every sheet except the last. Adhesive component I and II are typically applied in a weight ratio of 1:1 to 1:1.5. Veneer sheets are typically from 0.5 to 3 mm thick. Most common wood species are beech, but all types of wood can be used. Plastic sheets, thin metal sheets, paper or cardboard may also be used, preferably in combination with wood. The number of veneer layers depends on the envisaged end-product. For production of bed-slats the number of veneer sheets is about 10, for chairs about 20 and for making clothes hangers about 5.

Separate application of adhesive components I and II includes, for example, application of the adhesive component I onto one or several wood based materials and application of the adhesive component II onto one or several wood based materials onto which no adhesive component I have been previously applied. Thereafter, the wood based materials onto which only adhesive component I has been applied and the wood based materials onto which only adhesive component II has been applied are joined together providing a mixing of the two components forming an adhesive system which can be cured. Separate application also includes, for example, application of the adhesive component I and II onto the same surface of the wood based materials. The two components may be applied completely onto each other, partially onto each other, or without being in contact with each other. The surface of the wood based material with both components applied is thereafter joined with another surface of a wood based material, which also may or may not have been applied with both adhesive components, thereby providing during the pressing a good mixing of the adhesive components forming an adhesive system which can be cured. Separate application of adhesive component I and adhesive component II can be made in any order onto the wood based materials to be glued.

The invention will now further be described in connection with the following examples which, however, not should be interpreted as limiting the scope of the invention.

Tests Methods:
Shear Strength Test (Based on the Principles of BS 1203/1204)

The wood joints are cut from a 3-layer plywood of beech, glued as described in the standards. The wood joints are tested after one week conditioning in a standard climate of 20° C./65% RH. The tests are performed both on untreated wood joints (dry test) and after conditioning in cold water (20° C.) for 24 h (cold water test). The shear strength of the test pieces was tested in an Alvetron TCT-50 materials testing machine.
Knife Test; for Evaluation of Layer Bond Quality The gluing quality was assessed by inserting a chisel into the glue lines to split the wood pieces apart. The resulting fracture surface was visually inspected and fracture of the wood vs. fracture in the glue line as such was assessed by visual inspection of the fracture. Results are given in % wood fracture, where 100% wood fracture indicates a glue line of good quality as there is no fractures in the glue line as such. Values above 60% are acceptable and values above 80% are considered very good.
Determination of Tensile Shear Strength of Lap Joints According to EN 205

Tests for adhesives for wood and derived timber products for the assessment of their resistance to hot and cold water. A symmetrical bonded single lap joint between two symmetrical wooden adherents are subjected to specified conditioning treatments (described in EN 12765) and strained to rupture by a tensile force parallel to the grain. The tensile force of the test pieces was tested in an Alvetron TCT-50 materials testing machine.
Classification of Thermosetting Wood Adhesives for Non Structural Applications According to EN 12765

The standard classifies thermosetting resin based wood adhesives for non-structural applications into durability classes C1 to C4 based on the dry and wet strengths (tensile strength/shear strength) of bond-lines measured under specific conditions after various conditioning treatments, as illustrated below. The lap joints are prepared as described in EN 205.

| Serial number | Conditioning sequence Duration and condition | Adhesive strength in N/mm² Durability classes | | | |
|---|---|---|---|---|---|
| | | C1 | C2 | C3 | C4 |
| 1 | 7 days[1] in standard atmosphere | ≧10 | ≧10 | ≧10 | ≧10 |
| 2 | 7 days in standard atmosphere 1 day in water at (20 ± 5° C.) | | ≧7 | ≧7 | ≧7 |
| 3 | 7 days in standard atmosphere 3 h in water at (67 ± 2° C.) 2 h in water at (20 ± 5° C.) | | | ≧4 | |
| 4 | 7 days in standard atmosphere 3 h in boiling water 2 h in water at (20 ± 5° C.) | | | | ≧4 |

[1]20 C./65% RH (dry test)

| Class | Description of durablilty classes |
|---|---|
| C1 | Interior, in which the moisture content of the wood do not exceed 15% |
| C2 | Interior with occasional short-term exposure to running or condensed water and/or to occasional high humidity provided the moisture content of the wood does not exceed 18% |
| C3 | Interior with frequent short-term exposure to running or condensed water and/or to heavy exposure to high humidity. Exterior not exposed to weather. |

| Class | Description of durability classes |
|---|---|
| C4 | Interior with frequent long-term exposure to running or condensed water. Exterior exposed to weather but with protection by an adequate surface coating. |

ISO DIS 12460-4 Desiccator Method for Evaluation of Formaldehyde Emission

The principle of the test is to determine the formaldehyde emission by placing a test piece of known surface area in a desiccator at a controlled temperature and measuring the quantity of emitted formaldehyde absorbed in a specified volume of water after 24 h. The requirements for an F**** classification according to ISO 12460-4 is that the maximum concentration of formaldehyde in the water must be below 0.4 mg/l and the average concentration must be below 0.3 mg/l.
EN 717-1 (2004); EP Chamber Emission Test for Evaluation of Formaldehyde Emission Test pieces of known surface area are placed in a chamber, in which the temperature, relative humidity, air velocity and exchange rate are controlled at defined values. Formaldehyde emitted from the test pieces are mixed with the air in the chamber. The air in the chamber is sampled periodically. The formaldehyde concentration in the chamber is calculated from the formaldehyde concentration in the samples and the volume of the sampled air. It is expressed in milligrams per cubic meter ($mg/m^3$). Sampling is periodically continued until the formaldehyde concentration in the chamber has reached a steady-state. The requirement for E1 classification is emission, $0.125 \, mg/m^3$.
EN 717-2 (1994) Determination of Formaldehyde Release by the Gas Analysis Method The test allows determination of accelerated formaldehyde release from wood based panels. A test piece of known surface is placed in a closed chamber in which the temperature, humidity, airflow and pressure are controlled to defined volumes. Formaldehyde released from the test pieces mixes with the air in the chamber. This air is continually drawn from the chamber and passes through gas wash bottles, containing water, which absorbs the released formaldehyde. At the end of the test, the formaldehyde concentration is determined photometrically. The formaldehyde release is calculated from this concentration, the sampling time and the exposed area of the test piece is expressed in milligrams per square meter pr hour ($mg/m^2h$). The requirement for E1 emission is $5.0 \, mg/m^2h$ for unconditioned samples and $3.5 \, mg/m^2h$ for conditioned samples.

Adhesive Systems

The composition of adhesives used in the examples is given in Table 1. Adhesive compositions 1-3, 1-5 and 1-6, 1-7 and 1-8 are adhesive component I according to the invention. The general composition of the second component in the adhesive systems used in the examples is given in Table 2. Compositions 2-4 and 2-7 are adhesive component II according to the invention.

TABLE 1

| | Adhesive component I. | | | | | | | |
|---|---|---|---|---|---|---|---|---|
| | 1-1 | 1-2 | 1-3 | 1-4 | 1-5** | 1-6** | 1-7 | 1-8 |
| Adhesive type (I.a) | UF | UF | MF | EPI | MF | MF | mUF | MF |
| F/NH$_2$ | 0.7 | 0.6 | 1.1 | — | 0.53 | 0.9 | 0.8 | 0.8 |
| Resin solids content (wt %*) (I.b) | 61 | 62 | 59 | 20 | 62 | 62 | 66 | 58 |

TABLE 1-continued

| | Adhesive component I. | | | | | | | |
|---|---|---|---|---|---|---|---|---|
| | 1-1 | 1-2 | 1-3 | 1-4 | 1-5** | 1-6** | 1-7 | 1-8 |
| Organic filler (wt %) (I.b) | 7 | 7 | 7 | — | 13 | 13 | — | 8 |
| Inorganic filler (wt %) (I.b) | — | — | — | 43 | | | — | — |
| Other additives (wt %) (I.c) | 1.5 | 1.5 | 5 | 5 | | — | 0.1 | 6 |

*dry wt % relative to the total weight of adhesive component I
**Adhesive component 1-5 and 1-6 are powder adhesives which are dissolved in water before use, the data given in Table 1 is on the dissolved adhesive (ready for use).

TABLE 2

| | Adhesive Component II. | | | | | | | |
|---|---|---|---|---|---|---|---|---|
| | 2-1 | 2-2 | 2-3 | 2-4 | 2-5 | 2-6 | 2-7 | 2-8 |
| Water (wt %)* (II.g) | 32 | 30 | 48 | 33 | | 32 | 39.5 | 54.5 |
| Xanthan gum thickener (wt %) (II.b) | 0.5 | | | | | | | |
| Functionalized PVAc polymer** (wt %) (II.a) | | 29 | 26 | 26 | | | 26 | 32 |
| Polyvinyl-alcohol thickener (wt %) (II.b) | | | 5 | 1.5 | | | 3 | |
| Additives (biocide, defoamer, buffers etc) (wt %) (II.f) | 0.5 | 0.5 | 6 | 1 | | | | |
| Urea(wt %) (II.c) | 40 | 25 | | 30 | | 40 | 30 | |
| Formic acid (wt %) (II.d) | | | 15 | 8.5 | | | | |
| Lactic acid (wt %) | | | | | | | 1.5 | |
| Ammonium chloride (wt %) | 2 | 4 | | | | 4 | | |
| Aluminium nitrate 9-hydrate (wt %) | 12 | 11.5 | | | | 2 | | |
| Mono ammonium phosphate | | | | | | | | 4.5 |
| Aluminium chloride 6-hydrate | | | | | | | | 7.5 |
| Polypropylenglycol | | | | | | | | 1.5 |
| Inorganic filler (Kaolin) (wt %) (II.e) | 13 | | | | | 17 | | |
| Organic filler (wt %) | | | | | | 5 | | |
| Diphenylmethanedi-isocynate, Isomeres and homologues (wt %) (II.f) | | | | 75-90 | | | | |
| Isocyanates (wt %) | | | | | | | 5-25 | |

*dry wt % relative to the total weight of adhesive component II
**The functionalized PVAc polymer is used in the form of a 52% dispersion and contains some aluminium salt.

EXAMPLE 1

Plywood Samples

Plywood samples were prepared by gluing together three layer plywood of three sheets of 40×40 cm wide and 1.5 mm thick beech veneer with a moisture content of 6.5%. The veneer sheets were glued with the direction of the wood grain of the top and bottom veneer parallel to each other whereas the wood grain of the middle veneer was turned 90° on the top and bottom veneer. The gluing was done in a press with hot plates under the following conditions: Glue spread: $160 \, g/m^2$, pressure $1.2 \, N/mm^2$, pressing temperature: 90° C. and Pressing time: 6 min. Bond quality tests were done on samples of 3-layer plywood whereas emission tests were done on 5-layer plywood.

In order to get a good evaluation of the bond quality independent of the quality of the veneer, the glue system with adhesive composition 1-1 and composition 2-1 (100 parts by weight (pbw) and 20 pbw respectively) were used as reference as this is a system commonly used for form pressing. This was done by gluing half of the 3-layer plywood board with the reference system whereas the other half was glued with the glue system to be investigated. The bond quality was evaluated according to BS 1203/1204. For the emission test according to ISO 12460-4, boards of 5-layer plywood (alternating grain direction on all 5 layers of veneer) were glued as described above. The results are given in Table 3. Solid beech wood was included in the test resulting in emission of 0.03 mg/l.

TABLE 3

Bond quality of adhesive system

| Board nr. | Adhesive sample | Mixing ratio | Dry test N/inch² | Cold water test N/inch² | Emission results (mg/l) |
|---|---|---|---|---|---|
| C1.1 | 1-1/2-1 (reference) | 100:20 | 1946 | 1661 | 0.9 |
|  | 1-2/2-2 | 100:35 | 1626 | 902 | 0.16 |
| C1.2 | 1-1/2-1 (reference) | 100:20 | 1691 | 1678 |  |
|  | 1-3/2-3 | 100:100 | 1753 | 1918 | 8.94 |
| E1.3 | 1-1/2-1 (reference) | 100:20 | 1830 | 1641 |  |
|  | 1-3/2-4 | 100:100 | 1856 | 1781 | 0.11 |
| E1.4 | 1-1/2-1 (reference) | 100:20 | 1893 | 1653 |  |
|  | 1-3/2-4 | 100:150 | 1678 | 1287 | 0.03 |
|  | 1-1/2-1 (reference) | 100:20 | 1736 | 1690 |  |
| E1.5 | 1-5/2-7 | 100:60 | 1753 | 1701 | 0.07 |

The results show that the strength of comparative low emission adhesive system C1.1 is inferior to the reference system in the dry test, but even more so in the cold water test. The comparative MF adhesive system C1.2, which is typically used for laminated beams, gives good bonding strength, but also gives very high formaldehyde emission.

The adhesive systems according to the invention E1.3 give very good bonding with slightly higher bond strength than the reference in both the dry test and the cold water test when the two components is mixed in the ratio 100:100. When the mixing ratio is increased to 100:150 as in E1.4 the bond quality is slightly reduced in the dry test and more so in the cold water test although the strength value still is higher than the test requirement; Both mixing ratios give emission results significantly better than the requirement for F** and the emission result for adhesive system E1.4 is at the same level to the emission that was obtained for solid beech wood. The adhesive system according to the invention E1.5 has the same bond quality as the reference, but emission significantly lower than the requirement for F**.

EXAMPLE 2

Form Pressed Samples Produced with Different Adhesive Technologies

To get a comparison with a total formaldehyde free system, an EPI adhesive system based on above described adhesive compositions 1-4 and 2-5 was included in a test run. Adhesive components are combined in ratios as indicated in Table 4.

The form pressed construction that was produced in the test run consisted of 17 layers of 1.5 mm thick beech veneer stacked with the grain of each veneer parallel to the other veneers. A stack was laid with veneer layers, to which 160 g/m² of adhesive was applied on both sides through a roller spreader, between dry veneer layers. The glue spread of the EPI system was only 135 g/m². The stacks were placed in a RF press for pressing for 1 min and 50 sec for glue system 1-2/2-2 and 1-3/2-4 and, in order to get adequate bonding, for 4 min for the EPI system 1-4/2-5. After pressing the glued constructions were stored until they had cooled down, whereupon they were wrapped to prevent formaldehyde emission until the preparation of the samples for the formaldehyde emission tests. The emission results according to ISO 12460-4 are given in Table 4.

TABLE 4

Emission data (ISO 12460-4)

| Adhesive sample | Adhesive system | Mixing ratio | Emission results mg/l |
|---|---|---|---|
| C2.1 | 1-1/2-1 | 100/20 | 1.79 |
| C2.2 | 1-2/2-2 | 100:30 | 0.91 |
| E2.3 | 1-3/2-4 | 100:100 | 0.28 |
| E2.4 | 1-3/2-4 | 100:120 | 0.16 |
| C2.5 | 1-4/2-5 | 100:10 | 0.06 |

The adhesive system according to the invention E2.3 and E2.4 as well as the EPI system C2.5 passed the requirement for F**** whereas the state of the art UF system C2.1 and the low emission UF glue system C2.2 did not. The knife test showed that the bond quality was very good for all the glue systems.

EP Chamber Emission Test

The formaldehyde emission from E2.4 and C2.1 were also measured according to the European chamber method EN 717-1. The results are given in Table 5. Pure beech wood was also included in the test giving an emission result of 0.006 mg/m³. E2.3 has significantly lower emission in this test than C2.1. The emission value of E2.4 is comparable to those obtained for pure beech wood.

TABLE 5

Emission according to EN 717-1

| Adhesive sample | Adhesive system | Mixing ratio | Emission results mg/m³ |
|---|---|---|---|
| C2.1 | 1-1/2-1 | 100/20 | 0.08 |
| E2.4 | 1-3/2-4 | 100:120 | 0.003 |

During the test run it was observed that the glue mix of the EPI system thickened very fast in the roller spreader, such that after 45 min. it was very thick and too difficult to use, whereas the other glue systems could be used for around 1.5 h. It was also noticed that the glue applied on the veneer dried much faster for the EPI glue; after glue application the stack had to be placed in the press within 6-8 min, whereas for the other systems it was possible to wait for over 15 min. The EPI system therefore is very sensitive with respect to production stops both due to the rapid thickening in the roller spreader as well as due to very short time from application to when it had to be pressed.

EXAMPLE 3

Form Pressed Examples

Example 3: Form pressed samples were produced with a low emission UF system 1-1/2-6 and an adhesive system according to the invention 1-6/2-7. The adhesive 1-6 is a powder MF adhesive that was previously prepared by dissolving in water immediately before use to give 1-6.

Form pressed samples E3.2 and E3.3 were produced with adhesive systems 1-6/2-7. The form pressed constructions produced in the test run was a ca 19 mm thick panel constructed from 1.5 mm thick beech veneers stacked with the grain of each veneer parallel to the other veneers. A stack was laid with veneer layers, to which 120 g/m² of adhesive was applied on both sides through a roller spreader on all the veneers except the outer veneers. The stacks were placed in a hot press with the temperature 121° C. for 12 min. After pressing the glued constructions were stored until they had cooled down, whereupon they were wrapped to prevent formaldehyde emission until the preparation of the samples for the formaldehyde emission tests. The emission results according to ISO 12460-4 and EN 717-1 are given in Table 6.

TABLE 6 emission tests according to ISO 12460-4 and EN 717-1

| Adhesive sample | Adhesive system | Mixing ratio | Emission results, mg/l | Emission results, mg/m³ |
| --- | --- | --- | --- | --- |
| C3.1 | 1-1/2-6 | 100/20 | 1.5 | 0.06 |
| E3.2 | 1-6/2-7 | 100/75 | 0.3 | 0.011 |
| E3.3 | 1-6/2-7 | 100:100 | 0.2 | 0.008 |

Tests were also done to look at how long a stack of veneer with glue applied could be stored before pressing without getting problems with dry-out and poor bonding. The time from glue application to the stack is in the press is called assembly time. The results are given in Table 7.

TABLE 7

Assembly time tolerance

| Adhesive sample | Adhesive system | Mixing ratio | Time from glue application until pressing | Bond quality |
| --- | --- | --- | --- | --- |
| C3.1 | 1-1/2-6 | 100/20 | 15 | Good bond quality |
|  |  |  | 40 | Poor bond quality |
|  |  |  | 80 min | Poor bond quality |
| E3.3 | 1-6/2-7 | 100/100 | 15 | Good bond quality |
|  |  |  | 40 min | Good bond quality |
|  |  |  | 80 min | Good bond quality |

The glue system according to the invention tolerates significantly longer assembly times than the low emission UF system, and also longer than that of the EPI system, as shown in Table 5 above.

EXAMPLE 4

Parquet Floor Element Samples

Parquet samples were prepared with a 4 mm beech lamella top layer, a 8 mm pine rib mat core layer and a 2 mm birch back layer using 160 g/m2 glue spread and pressing at 90° C., for 6 min at a pressure of 1.0 N/mm2. The formaldehyde emission of the obtained parquet was tested according to ISO DIS 12460-4. The bond quality of the parquet samples was tested in dry condition by the knife test. The results are given in Table 8. The results show that the bond quality is very good for all the systems, but that the state of the art UF system C4.1 has much too high emission whereas the systems according to the invention E4.2 and E4.3 has emissions well below the requirement for F****.

TABLE 8

Emission results according to ISO DIS 12460-4.

| Adhesive sample | Adhesive system | Mixing ratio | Emission results mg/l | % wood failure |
| --- | --- | --- | --- | --- |
| C4.1 | 1-1/2-1 | 100/20 | 1.98 | 90 |
| E4.2 | 1-3/2-4 | 100:100 | 0.13 | 90 |
| E4.3 | 1-3/2-4 | 100:150 | 0.05 | 90 |

EXAMPLE 5

Test of Moisture Resistance According to EN 205/EN 12765 (C2, C3, C4)

The moisture resistance of the state of the art UF system 1-1/2-1 and the systems according to the invention, 1-3/2-4 and 1-6/2-7 was tested according to EN 12765. The samples for the tensile tests (shear strength) were prepared as described in EN 205. The results are given in Table 9 together with the requirements as specified in EN 12765.

TABLE 9

Tensile tests (shear strength)

| Adhesive sample | Adhesive system | Dry test N/mm² | Cold water test N/mm² | Hot water test N/mm² | Boil test N/mm² |
| --- | --- | --- | --- | --- | --- |
| C5.1 | 1-1/2-1 | 14.8 | 9.1 | 0.6 | — |
| E5.2 | 1-3/2-4 | 18.5 | 9.5 | 13.1 | 7.8 |
| E5.3 | 1-6/2-7 | 18.8 | 12.3 | — | 9.8 |

The UF system C5.1 passes the requirements for the C2 test but fails the C3 test, whereas the systems according to the invention, E5.2 and E5.3, even passes the requirements for C4 quality. Hence the systems according to the invention not only gives lower emission than the normal UF systems as shown in example 1-4, they also give significantly improved durability and moisture resistance.

EXAMPLE 6

Production of Solid Wood Panels

Solid wood panels were prepared by gluing together 20 mm thick and 45 mm wide pine lamellas. Before gluing ca 150 g/m² adhesive mix were applied on the side of the pine lamellas with a vertical roller. Immediately after glue application the pine lamellas were assembled next to each before going into a hot press with side pressure and a temperature of ca 95° C. and pressed for 90 seconds.

Both unglued pine lamellas and samples of the wood panels were collected for emission tests according to EN 717-2 as well as for test of bond quality by knife test. Additionally a reference panel, according to the general teaching of U.S. Pat. No. 6,590,013, glued with a melamine modified UF glue (1-7) used with a standard hardener 2-8 was collected for emission tests. The emission of unglued pine lamellas was measured to be 0.3 mg/l.

The results of the emission tests and evaluation of the bond quality are given in Table 10.

TABLE 10

Emission test according to EN 717-2

| Adhesive sample | Adhesive system | Emission results, mg/l | % wood failure |
|---|---|---|---|
| C6.1 | 1-7/2-8 | 1.2 | 80-100% |
| E6.2 | 1-3/2-4 | 0.4 | 80-100% |

Normally there are counteractive tendencies as between achieving high bond strength and low formaldehyde emission levels such that there appears to be an inverse relationship as between the bond strength and emission levels. As efforts were made to reduce emission levels of formaldehyde it was inevitable that also bond strength decreased. The adhesive system according to the invention breaks this relationship such that both increased bond strength and reduced emission levels are simultaneously observed. The adhesive system according to the invention displays bond strengths of 1100 N/inches$^2$ (according to BS1203/1204) or higher and emission levels of 0.5 mg/l or lower (according to ISO 12460-4). Preferably, the emission level at a bond strength of 1100 N/inches$^2$ is below 0.4, more preferably below 0.3, more preferably below 0.2, more preferably below 0.1, most preferably below 0.05 mg/l. In some embodiments of the adhesive system according to the invention, such as E1.4 discussed above, the emission levels are so low that they meet and/or exceed strict requirements, such as the F**** requirement and even achieve emission levels comparable to unglued beech wood.

There are various commercial advantages to this tandem increase in glue quality and decrease in unwanted formaldehyde emission levels. For example, products utilizing the adhesive system of the present invention may be suitable for long term indoor use because the formaldehyde emission levels are so low that they meet and/or exceed increasingly stringent health requirements. Additionally, products utilizing the adhesive system of the present invention may be suitable for long term outdoor use because the bond quality is so high that the adhesive system can withstand adverse weathering effects such as UV and moisture exposure.

What is claimed is:
1. A two-component adhesive system comprising:
   adhesive component I comprising in dry wt % relative to the total weight of adhesive component I for components I.a)-I.c):
   I.a) 50-70 wt % of a melamine-formaldehyde MF type resin and
   I.b) 0-20 wt % of organic or inorganic filler,
   I.c) 0-10 wt % of further additives,
   I.d) 25-40 wt % water;
   adhesive component II comprising in dry wt % relative to the total weight of adhesive component II for components II.a)-II.f):
   II.a) 20-40 wt % of a water based dispersion adhesive,
   II.b) 0-10 wt % of a thickener,
   II.c) 15-40 wt % of a formaldehyde scavenger,
   II.d) an acidic compound in an amount such that the pH of adhesive component II is 1.5-6.5,
   II.e) 0-20 wt % of organic or inorganic filler,
   II.f) 0-10 wt % of further additives,
   II.g) 25-40 wt % water, and
   wherein adhesive component I and II are to be applied in a weight ratio I:II of 1:0.5 to 1:1.5, and the adhesive system has a molar ratio of formaldehyde to total amino group between 0.2 and 0.7; and
   wherein the formaldehyde scavenger II.c) is an amino-compound selected from the group consisting of: urea, thiourea, amines, and ammonia; and
   wherein the MF type resin (I.a) is either MF resin (the reaction product of substantially pure M and F) or urea modified MF resin (uMF) comprising urea in a relatively small amount or modified MF or uMF resins.

2. The two-component adhesive system according to claim 1, wherein the pH of adhesive component II is 1.5-4 and wherein the adhesive system has a molar ratio of formaldehyde to total amino group between 0.3 and 0.7.

3. The two-component adhesive system according to claim 1, wherein the solid weight ratio of melamine-formaldehyde type resin to formaldehyde scavenger is 1:0.11 to 1:1.20.

4. The two-component adhesive system according to claim 1, wherein the melamine-formaldehyde type resin (I.a) in adhesive component I has a molar ratio F/NH$_2$ of 0.4-1.2.

5. The two-component adhesive system according to claim 1, wherein the optional filler (I.b) in adhesive component I is an inorganic filler or an organic filler.

6. The two-component adhesive system according claim 1, wherein the adhesive component I comprises 0.1-10 wt % of one or more further additives (I.c) is selected from the group consisting of: anti-foaming agents, thickeners, surfactants, pigments, colorants, rheology modifiers, and flexibilisers.

7. The two-component adhesive system according to claim 1, wherein the adhesive component I has a viscosity between 1500 and 10000 mPas, viscosity measured with Brookfield RVT at 25° C., spindle 4, and at a speed of 20 rpm.

8. The two-component adhesive system according to claim 1, wherein the adhesive component I has a pH between 7 and 12.

9. The two-component adhesive system according to claim 1, wherein the dispersion adhesive (II.a) in adhesive component II is functionalized or un-functionalized PVAc, and further comprising a crosslinking agent selected from the group of: aluminum salt, glyoxal and boric acid.

10. The two-component adhesive system according to claim 1, wherein the adhesive component II comprises 0.1-10 wt % of thickener (II.b), different from component II.a, to adjust the viscosity.

11. The two-component adhesive system according to claim 1, wherein the adhesive component II has a viscosity between 1500 and 10000 mPas.

12. The two-component adhesive system according to claim 1, wherein the viscosity of the adhesive obtained after mixing of components I and II is between 1000 and 5000 mPas.

13. The two-component adhesive system according to claim 1, wherein the adhesive component II comprises 15 to 40 wt % of an amino-compound as formaldehyde scavenger (II.c).

14. The two-component adhesive system according to claim 1, wherein the adhesive component II comprises an acidic compound (II.d) in an amount such that the pH of adhesive component II is between 1.5 and 6.5.

15. The two-component adhesive system according to claim 1, wherein the acidic compound II.d is a carboxylic acid, or an acidic salt or a combination thereof.

16. The two-component adhesive system according to claim 1, wherein the acidic compound II.d is one or more carboxylic acids selected from the group consisting of formic acid, acetic acid and lactic acid.

17. The two-component adhesive system according to claim 1, wherein the pH of the adhesive obtained after mixing of components I and II is between 3.3 and 6.5.

18. The two-component adhesive system according to claim 1, wherein the optional filler (II.e) in adhesive component II is chosen to be stable at pH of 1.5 to 6.5.

19. The two-component adhesive system according to claim 1, wherein the adhesive composition II comprises a cross-linking agent for cross-linking the dispersion adhesive II.a, wherein the crosslinking agent is selected from the group of: aluminum salt, glyoxal and boric acid.

20. The two-component adhesive system according to claim 1, having a shear strength above 1100 N/inch$^2$, as measured on a three layer beech plywood in cold water test according to BS 1203/1204 and an average emission below 0.5 mg/l when tested according to ISO-12460-4, as measured on a 5 layer plywood samples glued with the glue system.

21. A two-component adhesive assembly comprising adhesive components I and II according to claim 1 wherein each component is housed in a separate container.

22. The two-component adhesive assembly according claim 21, wherein the two-component adhesive assembly is used in the production of interior wood products comprising form-pressed products, parquet floor elements, solid wood panels with very low formaldehyde emission.

23. The two-component adhesive system according claim 1, wherein the two-component adhesive system is used in the production of interior wood products comprising form-pressed products, parquet floor elements, solid wood panels with very low formaldehyde emission.

24. A method for the production of interior wood products with low formaldehyde emission, comprising the steps of:
applying adhesive I and II of the two-component adhesive system comprising:
adhesive component I comprising (in dry wt % relative to the total weight of adhesive component I):
I.a) 50-70 wt % of a melamine-formaldehyde (MF) type resin and
I.b) 0-20 wt % of organic or inorganic filler,
I.c) 0-10 wt % of further additives,
I.d) 25-40 wt % water;
adhesive component II comprising (in dry wt % relative to the total weight of adhesive component II):
II.a) 20-40 wt % of a water based dispersion adhesive,
II.b) 0-10 wt % of a thickener,
II.c) 15-40 wt % of a formaldehyde scavenger,
II.d) an acidic compound in an amount such that the pH of adhesive component II is 1.5-6.5,
II.e) 0-20 wt % of organic or inorganic filler,
II.f) 0-10 wt % of further additives,
II.g) 25-40 wt % water;
wherein adhesive component I and II are to be applied in a weight ratio I:II of 1:0.5 to 1:1.5, and the adhesive system has a molar ratio of formaldehyde (F) to total amino group (F/NH$_2$) between 0.2 and 0.7;
wherein the formaldehyde scavenger II.c) is an amino-compound selected from the Group consisting of: urea, thiourea, amines, and ammonia;
wherein the MF type resin (I.a) is either MF resin (the reaction product of substantially pure M and F) or urea modified MF resin (uMF) comprising urea in a relatively small amount or modified MF or uMF resins; and
wherein the two-component system is applied in premixed form or separate, either simultaneous or consecutively, to one surface or on both opposing surfaces of wood layers to be bonded over at least part of the surface area thereof,
assembling the wood layers provided with adhesive in a stack, and
pressing the stack at elevated temperature to shape the stack and cure the adhesive.

25. The method according to claim 24, wherein the stack is pressed in a heated press or radio frequency press at a temperature between 60 and 120° C. at a pressure between 0.5 and 2 N/mm$^2$.

26. The method according to claim 24, wherein the interior wood products comprise at least one of: form-pressed products, parquet floor elements and solid wood panels.

27. A two-component adhesive system comprising:
adhesive component I comprising in dry wt % relative to the total weight of adhesive component I for components I.a)-I.c):
I.a) 50-70 wt % of a melamine-formaldehyde type resin and
I.b) 0-20 wt % of organic or inorganic filler,
I.c) 0-10 wt % of further additives,
I.d) 25-40 wt % water;
adhesive component II comprising in dry wt % relative to the total weight of adhesive component II for components II.a)-II.f):
II.a) 20-40 wt % of a water based dispersion adhesive,
II.b) 0-10 wt % of a thickener,
II.c) 15-40 wt % of a formaldehyde scavenger,
II.d) an acidic compound in an amount such that the pH of adhesive component II is 1.5-6.5,
II.e) 0-20 wt % of organic or inorganic filler,
II.f) 0-10 wt % of further additives, and
II.g) 25-40 wt % water
wherein the adhesive component II has a viscosity between 1500 and 10000 mPas; and
wherein the formaldehyde scavenger (II.c) is an amino-compound selected from the group consisting of: urea, thiourea, amines, and ammonia; and wherein the MF type resin (I.a) is either MF resin (the reaction product of substantially pure M and F) or urea modified MF resin (uMF) comprising urea in a relatively small amount or modified MF or uMF resins.

* * * * *